(12) United States Patent
Hobson

(10) Patent No.: US 6,761,400 B2
(45) Date of Patent: Jul. 13, 2004

(54) BICYCLE SEAT

(76) Inventor: Richard Hobson, 24410 Victory Blvd. #4, Woodland Hills, CA (US) 91367

( * ) Notice: Subject to any disclaimer, the term of this patent is extended or adjusted under 35 U.S.C. 154(b) by 0 days.

(21) Appl. No.: 10/265,300

(22) Filed: Oct. 5, 2002

(65) Prior Publication Data

US 2004/0066066 A1 Apr. 8, 2004

(51) Int. Cl.$^7$ .................................................. B62J 1/00
(52) U.S. Cl. .................. 297/201; 297/215.13; 297/312; 297/195.1
(58) Field of Search .............................. 297/195.1, 201, 297/215.14, 217.2, 215.15, 215.13, 312; 248/285.1, 287.11; 280/287

(56) References Cited

U.S. PATENT DOCUMENTS

| | | | |
|---|---|---|---|
| 560,698 A | 5/1896 | Dyer | |
| 604,347 A | * 5/1898 | Bray | 297/201 |
| 606,818 A | 7/1898 | Best | |
| 608,089 A | * 7/1898 | Wellmann | 297/312 |
| 619,768 A | 2/1899 | Lewis, Jr. | |
| 656,854 A | 8/1900 | Nord | |
| 1,564,339 A | * 12/1925 | Fraser et al. | 33/515 |
| 1,623,818 A | 4/1927 | Tichota | |
| 4,089,559 A | * 5/1978 | Prange et al. | 297/201 |
| 4,387,925 A | 6/1983 | Barker et al. | 297/201 |
| 4,512,608 A | 4/1985 | Erani | 297/201 |
| 4,541,668 A | 9/1985 | Rouw | 297/201 |
| 4,877,286 A | 10/1989 | Hobson et al. | 297/195 |
| 5,529,326 A | * 6/1996 | Hwang | 280/220 |
| 5,547,155 A | * 8/1996 | Herting | 248/219.2 |
| 5,709,430 A | 1/1998 | Peters | 297/201 |
| 5,725,274 A | * 3/1998 | Bergmeister | 297/201 |
| 5,823,618 A | 10/1998 | Fox et al. | 297/201 |
| 5,911,474 A | * 6/1999 | Lee | 297/201 |
| 5,921,625 A | * 7/1999 | Muser | 297/215.15 |
| 5,988,740 A | * 11/1999 | Caraballo | 297/201 |
| 6,019,422 A | * 2/2000 | Taormino et al. | 297/195.1 |
| 6,056,356 A | 5/2000 | Unger, Jr. | 297/201 |
| 6,152,524 A | * 11/2000 | Cox | 297/201 |
| 6,209,954 B1 | 4/2001 | Bombardier | 297/201 |
| 6,290,291 B1 | * 9/2001 | Kojima | 297/201 |
| 6,357,825 B1 | 3/2002 | Bavaresco | 297/201 |
| 6,378,938 B1 | 4/2002 | Nelson | 297/202 |
| 6,402,235 B1 | 6/2002 | Letendre | 297/195.1 |

FOREIGN PATENT DOCUMENTS

GB        2121740 A  *  1/1984  ............. B62J/1/00

* cited by examiner

Primary Examiner—Peter M. Cuomo
Assistant Examiner—Stephen D'Adamo
(74) Attorney, Agent, or Firm—Angenehm Law Firm, Ltd; N Paul Friederichs

(57) ABSTRACT

A bicycle seat, including a seat frame; a first cushion joined to the seat frame, the first cushion being adapted to rotate forward and rearward; a second cushion joined to the seat frame, the second cushion being adapted to rotate forward and rearward; at least one first elastomer support joined between the first seat cushion and the seat frame; and at least one second elastomer support joined between the second seat cushion and the seat frame.

20 Claims, 5 Drawing Sheets

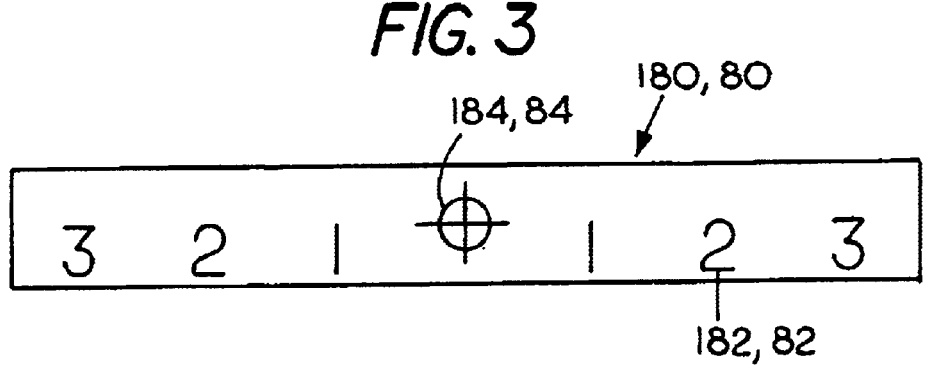
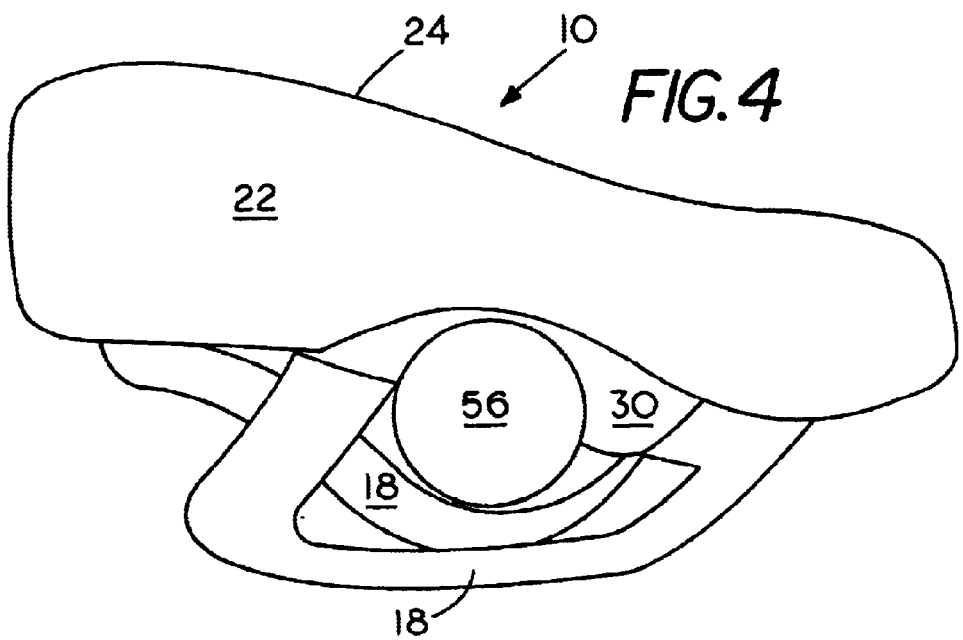
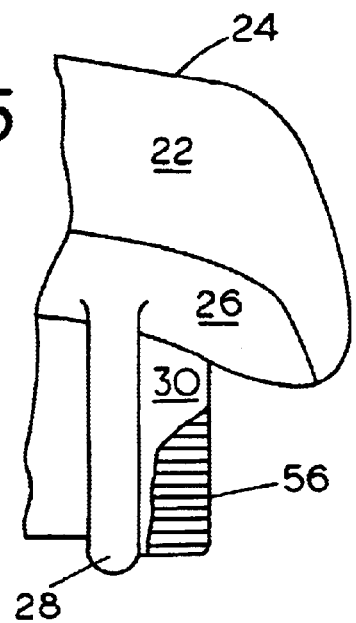

BICYCLE SEAT

BACKGROUND OF THE INVENTION

The present invention relates to bicycle seats and more particularly to bicycle seats having multiple cushions.

Bicycle seats are in many shapes and sizes. The typical bicycle seat is generally in the shape of a tear drop. The pointed end is referred to as a horn. Unfortunately, for male riders, the horn compresses the penile artery. Prolonged riding on bicycles is believed to cause permanent damage to the penile artery, which is a cause for lack of ability to obtain an erection. Such seats are also believed to cause damage to reproductive organs of females.

Thankfully, bicycle riding does not need to be so dangerous. Seats with two cushions and no horn are available. These seats distribute the weight of a rider differently than traditional seats, relieving the pressure placed on the penile artery. These seats allow some rocking of the cushions such that the cushions move with the rider. However, prior seats were incomplete in design in this regard. Unless the rider was positioned perfectly relative to the seat, the cushions remained in the all forward position or all rearward position. What is needed is a shock absorber between the cushions and the seat frame such that the seat will continue to rock with the rider even when the rider is not perfectly positioned.

These two cushion seats were used on stationary and other bicycles that were used by a number of riders. Each rider would adjust the cushions to fit their own need. Such adjustment takes time trial and error effort. What is needed is a method or mechanism that allows each rider to visually adjust the seat to the proper configuration for their own use, avoiding the constant sitting and standing effort needed in a trial and error approach.

Further, these seats had a problem with the location of the adjustment knob. If a rider wished to make a slight adjustment of the seat when riding, they had to stop and get off the bicycle. The adjustment was complex, involved and time consuming. As a result, the seat often was not properly adjusted to the comfort of the rider. What is needed is a reconfiguration of the adjustment mechanism, allowing the adjustment knob to be located to the side of the seat for ease of operation, such that the user can adjust the seat while traveling.

SUMMARY OF THE INVENTION

A bicycle seat is provided with a seat frame, a first cushion, a second cushion, at least one first elastomer support and at least one second elastomer support. The first cushion may be joined to the seat frame. The first cushion being adapted to rotate forward and rearward. The second cushion may be joined to the seat frame and the second cushion being adapted to rotate forward and rearward. The first elastomer support being joined between the first seat cushion and the seat frame. The second elastomer support joined between the second seat cushion and the seat frame.

In a first embodiment, shown in FIGS. 1 through 7, the bicycle seat is provided with a seat frame, having a core and a neck attachment.

The first cushion adjustably may be joined to the seat frame. The first cushion has a first cover joined to a first seat shell. The first seat shell being integral with structural supports and a first knob shroud.

The second cushion is adjustably joined to the seat frame. The second cushion has a second cover joined to a second seat shell. The second seat shell may be integral with structural supports and a second knob shroud.

A mechanism is provided for adjusting the first cushion relative to the seat frame. The first adjusting mechanism has at least one first elastomer support joined to the seat frame and the first seat shell. A first guide core may be movably joined to the first elastomer support. A first threaded shaft is rotatably secured to the first guide core and a first adjustment knob is operably joined to the first threaded shaft. The first adjustment knob is disposed adjacent the side of the first cushion.

A mechanism is provided for adjusting the second cushion relative to the seat frame. The second adjusting means has at least one second elastomer support, which is joined to the seat frame. The second elastomer support is joined to the second seat shell. A second guide core may be movably joined to the second elastomer support. A second threaded shaft is rotatably secured to the second guide core and a second adjustment knob operably joined to the second threaded shaft. The second adjustment knob is disposed adjacent the side of the side of the second cushion.

A gauge may be joined to the seat frame. The gauge is adapted to indicate the adjustment of the first and second seat cushions. The gauge may have indicia and a center point.

The second embodiment, shown in FIGS. 3 and 8–10, has a related structure to the first embodiment. The primary distinctions are found in the alternate arrangement of the first and second adjustment mechanisms. The second embodiment shows the first adjustment knob disposed adjacent the rear of the first cushion and the second adjustment knob disposed adjacent the rear of the second cushion. A plurality of first and second elastomer supports may be disposed between the first and second seat cushions and the frame.

Advantageously, the present invention provides a gauge for quickly adjusting the first and second seat cushions in situations where the bicycle is shared, such as a stationary bicycle.

Also advantageously, the first embodiment of the present invention allows a user to reach to their side while riding and adjust the first and second cushions.

As yet another advantage, the seat has additional shock absorption between the cushions and the frame, which adjusts as the first and second cushions rotate forward and rearward during use.

Other advantages of the present design will become apparent from reading the description and viewing the appended drawings.

DESCRIPTION OF THE DRAWINGS

FIG. 3 is a top view of the gauge of the first and second embodiments;

FIG. 4 is a side view of the first embodiment;

FIG. 5 is a partial rear view of the first embodiment, showing a portion of the first cushion;

DETAILED DESCRIPTION

Figure 1:
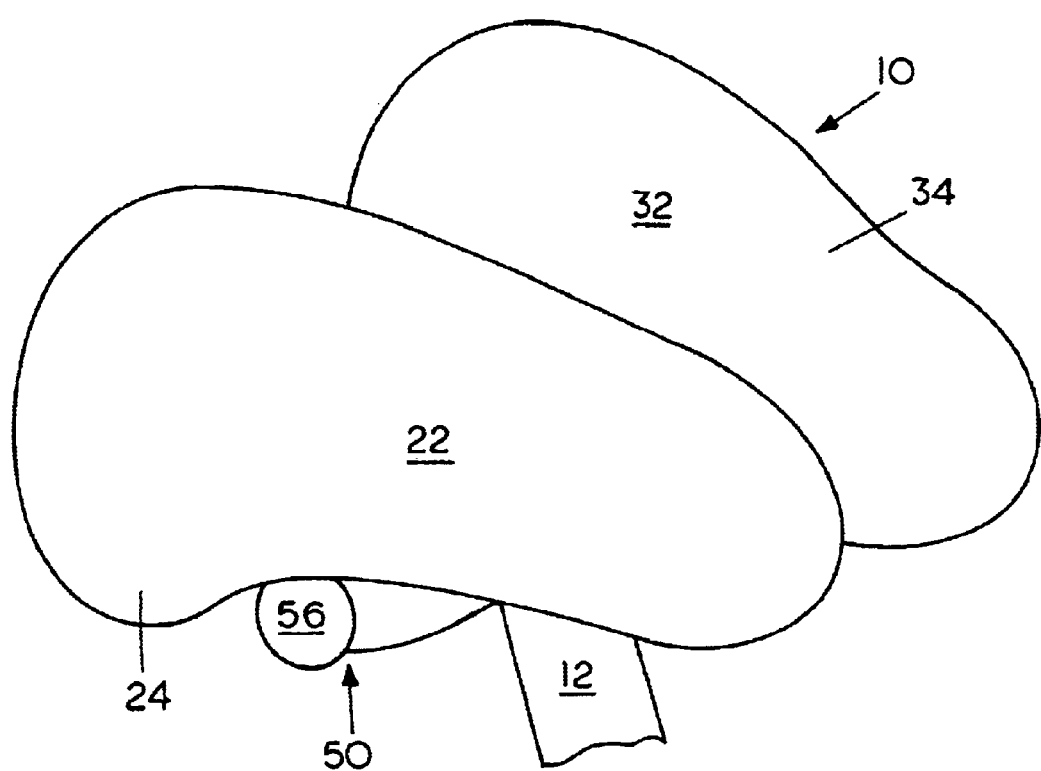
FIG. 1 is a perspective view of the first embodiment of the present invention.

The bicycle seat 10 of the first embodiment, FIGS. 1–7, may be provided with a seat frame 14, a first cushion 22, a second cushion 32, a mechanism 50 for adjusting the first cushion 22, a mechanism 68 for adjusting the second cushion 32 and a gauge 80. The first cushion 22 and second cushion 32 are adapted to be movable relative to each other. Each component will be discussed in serial fashion.

The seat frame 14 may be mounted on a seat post 12 of a standard bicycle, including stationary bicycles. The seat frame 14 is with a core 16 joined to a neck attachment 18. The neck attachment 18 is suitably designed for securement to the seat post 12.

The first cushion 22 may be adjustably joined to the seat frame 14. The first cushion 22 preferably has a first cover 24 joined to a first seat shell 26. The first seat shell 26 preferably is integral with structural supports 28 and a first knob shroud 30. The structural supports 28 add integrity to the first seat shell 26, while the first knob shroud 30 partially covers the first adjustment knob 56 as shown in FIGS. 4 and 5. The first adjustment knob 56 is disposed adjacent the side of the first cushion 22 for easy reach while a user is riding. The first cushion 22 is adapted to rotate forward and rearward to move with the body of a user. The first elastomer support 52, described more fully below, is adapted to laterally compress and elongate as the first cushion 22 is rotated forward and rearward.

The second cushion 32 may adjustably join to the seat frame 14. The second cushion 32 may have a second cover 34 joined to a second seat shell 36. The second seat shell 36 preferably is integral with structural supports 38 and a second knob shroud 40. The structural supports 38 add integrity to the second seat shell 36, while the second knob shroud 40 partially covers the second adjustment knob 74 as shown in FIGS. 4 and 5. The second adjustment knob 74 is disposed adjacent the side of the second cushion 32. The second cushion 32 is adapted to rotate forward and rearward to move with the body of a user. The second elastomer support 70, described more fully below, is adapted to laterally compress and elongate as the second cushion 32 is rotated forward and rearward.

Figure 6:
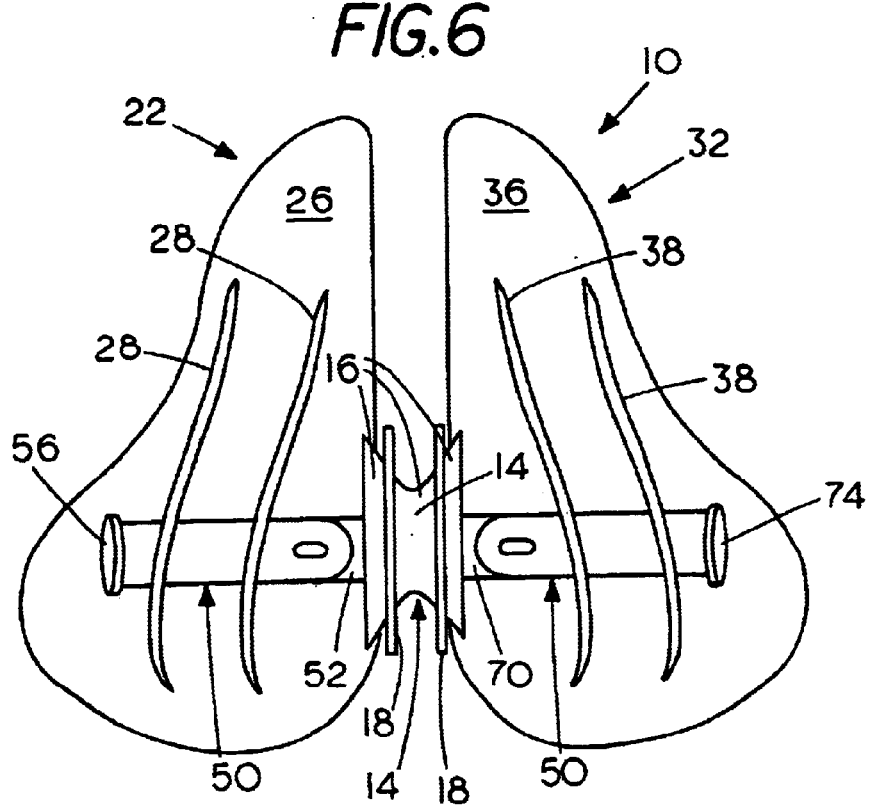
FIG. 6 is a bottom view of the first embodiment.
Figure 7:
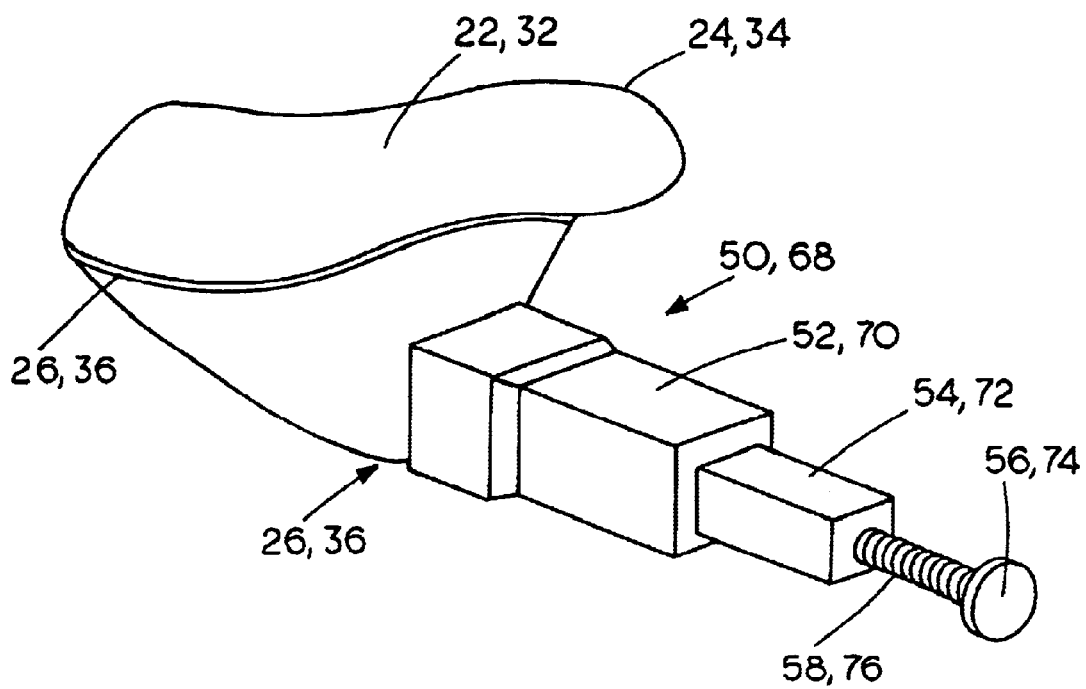
FIG. 7 is a perspective view of the adjustment mechanism of the first embodiment.

The mechanism 50 for adjusting the first cushion 22 relative to the seat frame 14. The first adjusting mechanism 50 has at least one first elastomer support 52 fixedly joined to the seat frame 14 as best seen in FIG. 6. The first elastomer support 52 may also be joined to the first seat shell 26. That is, the first elastomer support 52 may joined between the first cushion 22 and the seat frame 14 as will now be described with reference to FIG. 7.

A first guide core 54 may be movably joined to the first elastomer support 52. Specifically, the first guide core 54 may be received in the first elastomer support 52. A first threaded shaft 58 is rotatably secured to the first guide core 54 and a first adjustment knob 56 is operably joined to the first threaded shaft 58. As the first knob 56 is rotated the threaded shaft 58 is drawn into and moves the first guide core 54. The guide core 54 either stretches or compresses the first elastomer support 52, which is held by the seat frame 14. The first elastomer support 52 may be adapted to elongate as the first cushion 22 is moved away from the second cushion 32. The first adjustment knob 56 being generally fixed, other than rotational movement, to the first seat shell 26, causes the first seat shell 26 to move relative to the seat frame 14.

The mechanism 68 for adjusting the second cushion 32 relative to the seat frame 14. The second adjusting mechanism 68 has at least one second elastomer support 70 fixedly joined to the seat frame 14 as best seen in FIG. 6. The second elastomer support 70 may also be joined to the second seat shell 36. That is, the second elastomer support 70 may be joined between the second seat cushion 32 and the seat frame 14 as will now be described with reference to FIG. 7.

A second guide core 72 may be movably joined to the second elastomer support 70. Specifically, the second guide core 72 may be received in the second elastomer support 70. A second threaded shaft 76 is rotatably secured to the second guide core 72 and a second adjustment knob 74 is operably joined to the second threaded shaft 76. As the second knob 74 is rotated the threaded shaft 76 is drawn into and moves the second guide core 72. The guide core 72 either stretches or compresses the second elastomer support 70, which is held by the seat frame 14. The second elastomer support 70 may be adapted to elongate as the second cushion 32 is moved away from the first cushion 22. The second adjustment knob 74 being generally fixed, other than rotational movement, to the second seat shell 36, causes the second seat shell 36 to move relative to the seat frame 14.

Figure 2:
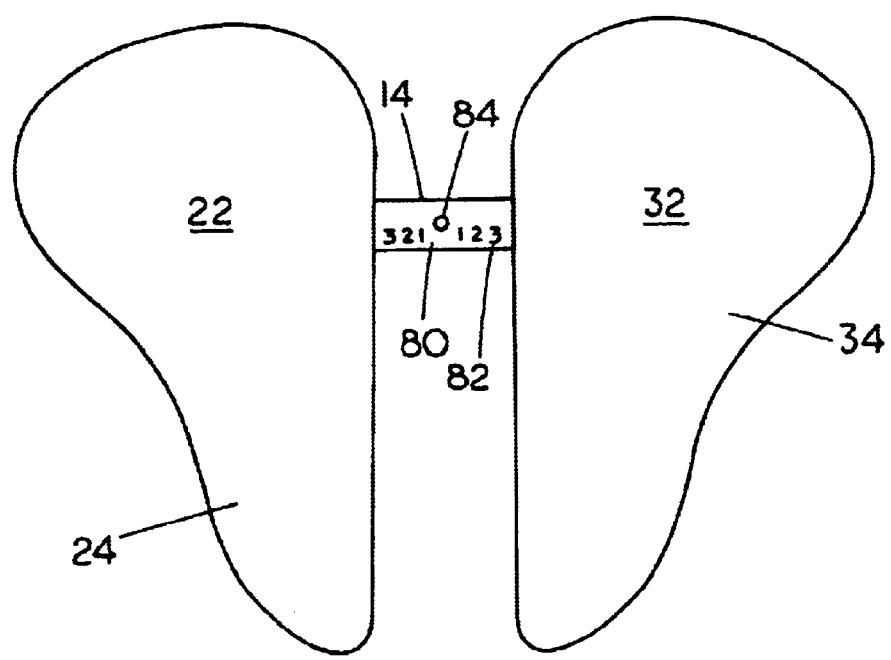
FIG. 2 is a top view of the first embodiment of the present invention, showing the first and second cushions spread and the gauge disposed therebetween.

The gauge 80 is joined to the seat frame 14 as shown in FIG. 2, showing the relative locations of the first and second cushions 22, 32. The gauge 80 may have indicia 82, such as numbers or a color gradient, and a center point 84. The indicia 82 or center point 84 may be a reference for a user in situations where the seat 10 is adjusted and readjusted by various users.

The bicycle seat 110 of the second embodiment, FIGS. 3 and 8–10, may be provided with a seat frame 114, a first cushion 122, a second cushion 132, a mechanism 150 for adjusting the first cushion 122, a mechanism 168 for adjusting the second cushion 132 and a gauge 180. The first cushion 122 and second cushion 132 are adapted to be movable relative to each other. Each component will be discussed in serial fashion.

The seat frame 114 may be mounted on a seat post 112 of a standard bicycle, including stationary bicycles. The seat frame 114 has a core 116 joined to a neck attachment 118. The neck attachment 118 is suitably designed for securement to the seat post 112.

Figure 9:
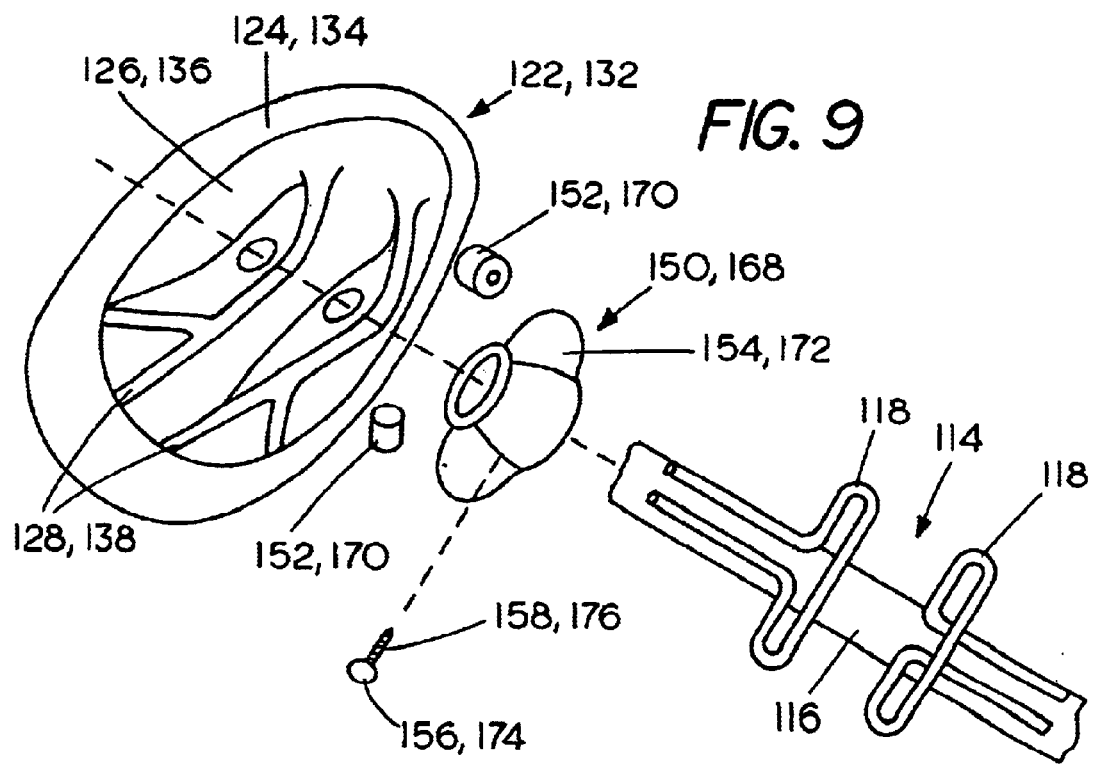
FIG. 9 is an exploded perspective view of the second embodiment, showing the adjustment mechanism.

The first cushion 122 may be adjustably joined to the seat frame 114. The first cushion 122 preferably has a first cover 124 joined to a first seat shell 126. The first seat shell 126 preferably is integral with structural supports 128. The structural supports 128 add integrity to the first seat shell 126 as shown in FIG. 9. The first adjustment knob 156 is disposed adjacent the rear of the first cushion 122. The first cushion 122 is adapted to rotate forward and rearward to move with the body of a user. The first elastomer support 152, described more fully below, is adapted to laterally compress and elongate as the first cushion 122 is rotated forward and rearward.

The second cushion 132 may adjustably join to the seat frame 114. The second cushion 132 may have a second cover 134 joined to a second seat shell 136. The second seat shell 136 preferably is integral with structural supports 138. The structural supports 138 add integrity to the second seat shell 136 as shown in FIG. 9. The second adjustment knob 174 is disposed adjacent the rear of the second cushion 132. The second cushion 132 is adapted to rotate forward and rearward to move with the body of a user. The second elastomer support 170, described more fully below, is adapted to laterally compress and elongate as the second cushion 132 is rotated forward and rearward.

Figure 8:
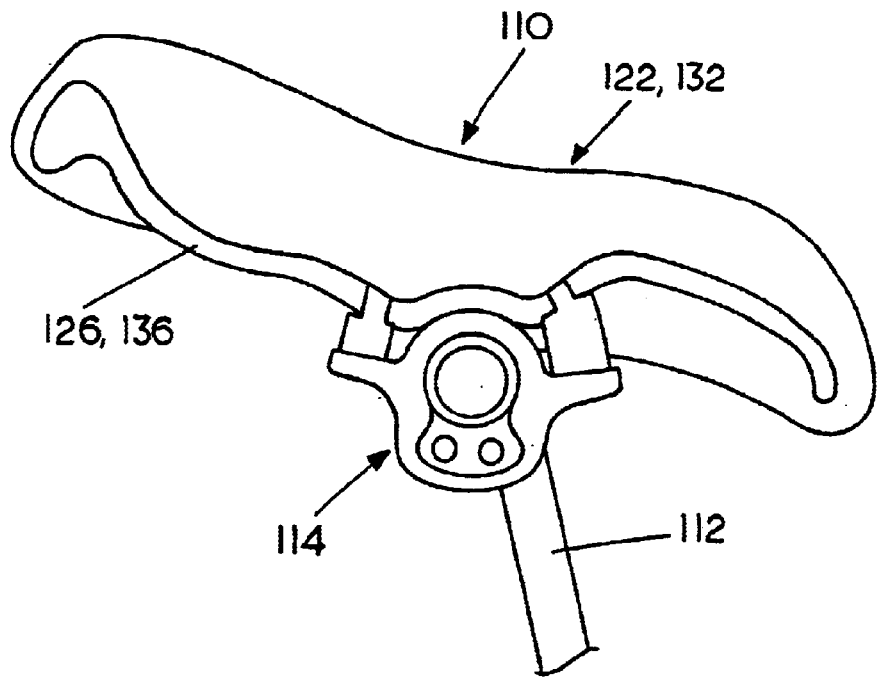
FIG. 8 is a side view of the second embodiment of the present invention.
Figure 10:
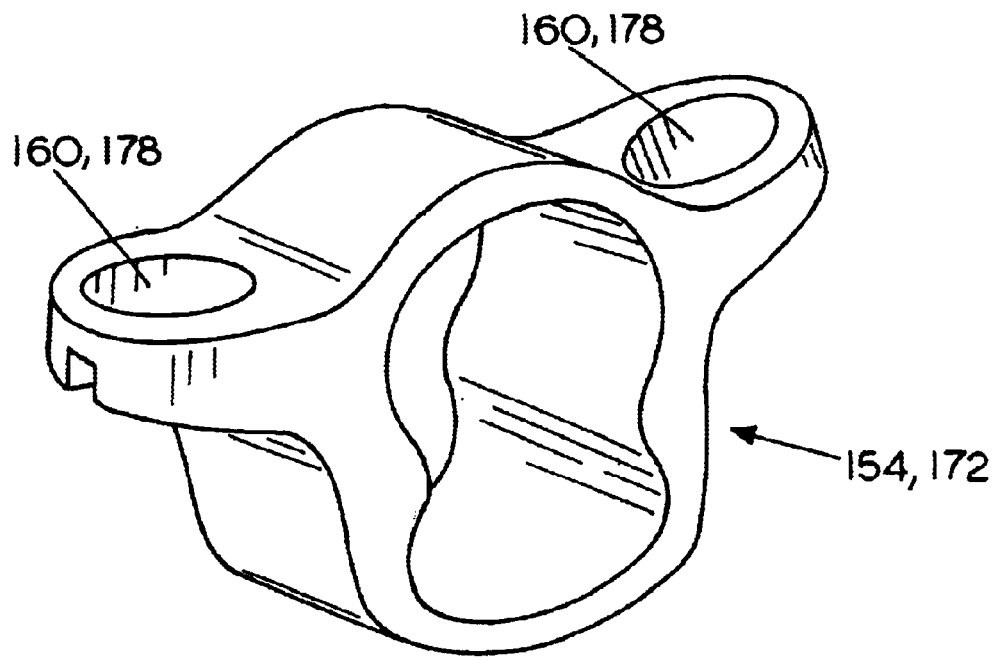
FIG. 10 is a perspective view of the guide core of the second embodiment.
Figure 11:
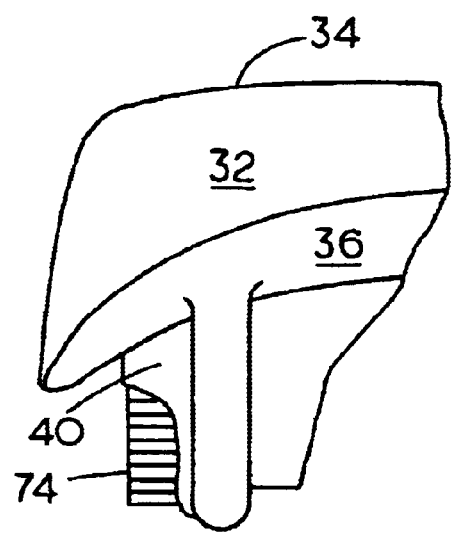
FIG. 11 is a partial rear view of the first embodiment, showing a portion of the second cushion.

The seat 110 is provided with mechanism 150 for adjusting the first cushion 122 relative to the seat frame 114. The first adjusting mechanism 150 has at least one first elastomer support 152, preferably a plurality fixedly joined to the seat frame 114 as best seen in FIG. 8. The first elastomer support 152 may also be joined to the first seat shell 126 on the first support seat 160 as shown in FIG. 10. That is, the first elastomer support 152 may joined between the first cushion 122 and the seat frame 114.

A first guide core 154 may be movably joined to the first elastomer support 152. Specifically, the first guide core 154 may receive the first elastomer support 152 on the first support seats 160. The first guide core 154 is positioned between structural supports 128 and secured via the core 116 of the seat frame 114, which passes through the structural supports 128 with the first guide core 154 positioned therebetween. A first threaded shaft 158 is rotatably secured to the first guide core 154 and a first adjustment knob 156 is operably joined to the first threaded shaft 158. As the first knob 156 is rotated the threaded shaft 158 is drawn into the first guide core 154 and biases against the core 116 of the seat frame 114. The adjustment knob 156 secures the first guide core 154 against the core 116, preventing lateral movement of the first cushion 122, while still allowing rocking motion.

The seat 110 is provided with mechanism 168 for adjusting the second cushion 132 relative to the seat frame 114. The second adjusting mechanism 168 has at least one second elastomer support 170, preferably a plurality, fixedly joined to the seat frame 114 as best seen in FIG. 8. The second elastomer support 170 may also be selectively joined to the second seat shell 136 on the second support seats 178. That is, the second elastomer support 170 may be joined between the second cushion 132 and the seat frame 114.

A second guide core 172 may be movably joined to the second elastomer support 170. Specifically, the second guide core 172 may receive the second elastomer support 170 on the second support seats 178. The second guide core 172 is positioned between structural supports 138 and secured via the core 116 of the seat frame 114, which passes through the structural supports 138 with the second guide core 172 positioned therebetween. A second threaded shaft 176 is rotatably secured to the second guide core 172 and a second adjustment knob 174 is operably joined to the second threaded shaft 176. As the second knob 174 is rotated the second threaded shaft 176 is drawn into the second guide core 172 and biases against the core 116 of the seat frame 114. The second adjustment knob 174 secures the second guide core 172 against the core 116, preventing lateral movement of the second cushion 132, while still allowing motion.

The gauge 180 is joined to the seat frame 114 in a manner like that shown in FIG. 2. The gauge 180 shows the relative locations of the first and second cushions 122, 132. The gauge 180 may have indicia 182, such as numbers or a color gradient, and a center point 184. The indicia 182 or center point 184 may be a reference for a user in situations where the seat 110 is adjusted and readjusted by various users.

Although the present invention has been described with reference to preferred embodiments, workers skilled in the art will recognize changes may be made in form and detail without departing from the spirit and scope of the invention.

I claim:

1. A bicycle seat, comprising:

a seat frame, having a core and a neck attachment, the neck connecting the core to a seat post;

a first cushion adjustably joined to the core of the seat frame, the first cushion having a first cover joined to a first seat shell, the first seat shell being integral with structural supports;

a second cushion adjustably joined to the core of the seat frame, the second cushion having a second cover joined to a second seat shell, the second seat shell being integral with structural supports;

means for adjusting the first cushion relative to the seat frame, the first adjusting means having at least one first elastomer support joined to the seat frame and the first elastomer support joined to the first seat shell, a first guide core movably joined to the first elastomer support, a first threaded shaft rotatably secured to the first guide core, and a first adjustment knob operably joined to the first threaded shaft;

means for adjusting the second cushion relative to the seat frame, the second adjusting means having at least one second elastomer support joined to the seat frame and the second elastomer support joined to the second seat shell, a second guide core movably joined to the second elastomer support, a second threaded shaft rotatably secured to the second guide core, and a second adjustment knob operably joined to the second threaded shaft; and a gauge joined to the core of the seat frame, the gauge being adapted to indicate the horizontal adjustment of the first seat cushion, the gauge being adapted to indicate horizontal the adjustment of the second seat cushion, the gauge having indicia and a center point.

2. The device of claim 1 wherein the first seat shell is integral with a first knob shroud and the second seat shell is integral with a second knob shroud.

3. The device of claim 1 wherein the first adjustment knob is disposed adjacent the side of the first cushion and the second adjustment knob is disposed adjacent the side of the second cushion.

4. The device of claim 1 wherein the first adjustment knob is disposed adjacent the rear of the first cushion and the second adjustment knob is disposed adjacent the rear of the second cushion.

5. The device of claim 1 wherein the at least one first elastomer support is a plurality of first elastomer supports and the at least one second elastomer support is a plurality of second elastomer supports.

6. A bicycle seat, comprising:

a seat frame, the seat frame configured to join to a seat post;

a first cushion adjustably joined to the seat frame;

a second cushion adjustably joined to the seat frame;

means for adjusting the first cushion relative to the seat frame, the first adjusting means having at least one first elastomer support joined to the first seat cushion, a first guide core joined to the first elastomer support;

means for adjusting the second cushion relative to the seat frame, the second adjusting means having at least one second elastomer support joined to the second seat cushion, a second guide core joined to the second elastomer support; and a gauge joined to the seat frame, the gauge being adapted to indicate the adjustment of the first seat cushion, the gauge being adapted to indicate the adjustment of the second seat cushion.

7. The device of claim 6 wherein the first seat shell is integral with a first knob shroud and the second seat shell is integral with a second knob shroud.

8. The device of claim 6 wherein the first adjustment knob is disposed adjacent the side of the first cushion and the second adjustment knob is disposed adjacent the side of the side of the second cushion.

9. The device of claim 6 wherein the first adjustment knob is disposed adjacent the rear of the first cushion and the second adjustment knob is disposed adjacent the rear of the second cushion.

10. The device of claim 6 wherein the at least one first elastomer support is a plurality of first elastomer supports and the at least one second elastomer support is a plurality of second elastomer supports.

11. The device of claim 6 wherein the first guide core is received in the first elastomer support.

12. The device of claim 11 wherein the second guide core is received in the second elastomer support.

13. The device of claim 6 wherein the first elastomer support is adapted to elongate as the first cushion is moved away from the second cushion.

14. The device of claim 13 wherein the second elastomer support is adapted to elongate as the second cushion is moved away from the first cushion.

15. The device of claim 6 wherein the first cushion is adapted to rotate forward and rearward.

16. The device of claim 15 wherein the first elastomer support is adapted to laterally compress and elongate as the first cushion is rotated forward and rearward.

17. A bicycle seat, comprising: a seat frame;

a first cushion joined to the seat frame, the first cushion being adapted to rotate forward and rearward;

a second cushion joined to the seat frame, the second cushion being adapted to rotate forward and rearward, the second cushion being horizontally adjustable from a first position to a second position and the first cushion being horizontally adjustable from a first position to a second position;

at least one first elastomer support joined to the first cushion and to the seat frame in both the first position and in the second position; and at least one second elastomer support joined to the second cushion and to the seat frame in both the first position and the second position.

18. The device of claim 17 further comprising a gauge disposed on the seat frame.

19. The device of claim 17 wherein the first cushion and second cushion are adapted to be movable relative to each other.

20. The device of claim 17 wherein the first elastomer support is adapted to laterally compress and elongate as the first cushion is rotated forward and rearward.

* * * * *